(12) United States Patent
Lee et al.

(10) Patent No.: US 10,413,842 B2
(45) Date of Patent: Sep. 17, 2019

(54) ENERGY-SAVING SEAWATER DESALINATION SYSTEM USING STEAM GENERATED IN NUCLEAR REACTOR, AND METHOD FOR DESALINATING SEAWATER

(71) Applicants: Chang Kun Lee, Seoul (KR); Hiehil Lee, Seoul (KR)

(72) Inventors: Chang Kun Lee, Seoul (KR); Hiehil Lee, Seoul (KR)

( * ) Notice: Subject to any disclaimer, the term of this patent is extended or adjusted under 35 U.S.C. 154(b) by 87 days.

(21) Appl. No.: 15/539,526

(22) PCT Filed: Dec. 29, 2014

(86) PCT No.: PCT/KR2014/012950
§ 371 (c)(1),
(2) Date: Jun. 23, 2017

(87) PCT Pub. No.: WO2016/104851
PCT Pub. Date: Jun. 30, 2016

(65) Prior Publication Data
US 2017/0348612 A1    Dec. 7, 2017

(30) Foreign Application Priority Data
Dec. 24, 2014  (KR) .......................... 10-2014-0188305

(51) Int. Cl.
*B01D 5/00*     (2006.01)
*C02F 1/16*     (2006.01)
(Continued)

(52) U.S. Cl.
CPC ......... *B01D 5/0078* (2013.01); *B01D 1/0058* (2013.01); *B01D 5/0075* (2013.01);
(Continued)

(58) Field of Classification Search
CPC ...... B01D 5/00; B01D 5/0075; B01D 5/0078; C02F 1/16
See application file for complete search history.

(56) References Cited

U.S. PATENT DOCUMENTS

2006/0056572 A1    3/2006  Lecomte
2010/0284507 A1*  11/2010  Uda ..................... G21C 15/04
                                                                      376/377

FOREIGN PATENT DOCUMENTS

KR    20-1999-0000612 U    1/1999
KR    10-2012-0130403 A   12/2012
(Continued)

OTHER PUBLICATIONS

International Search Report issued in connection with PCT/KR2014/012950.
(Continued)

*Primary Examiner* — Brian A McCaig
(74) *Attorney, Agent, or Firm* — Akerman LLP

(57) ABSTRACT

The present disclosure relates to a seawater desalination system which improves energy efficiency by applying a heated cooling water discharged from a nuclear power plant and high-temperature steam generated in a nuclear reactor to seawater desalination. A seawater desalination system related to an exemplary embodiment of the present disclosure includes: a steam supply pipe 40 which supplies heat exchange steam that is a part of the steam discharged from a turbine 20; a seawater supply pipe 36 which diverges from a discharge pipe 34; and a heat exchanger 50 which is connected to the steam supply pipe 40 so as to be supplied with the heat exchange steam, and connected to the seawater supply pipe 36 so as to be supplied with first seawater that is a part of the seawater discharged from a condenser 30, in which the heat exchanger 50 increases a water temperature of the first seawater by using heat included in the heat (Continued)

exchange steam, and the first seawater with the increased water temperature is supplied to the fresh water-generating unit 2 through a connection pipe 4, such that desalination of the first seawater is performed.

4 Claims, 3 Drawing Sheets

(51) Int. Cl.
     *F01K 17/04*      (2006.01)
     *B01D 1/00*      (2006.01)
     *C02F 103/08*      (2006.01)

(52) U.S. Cl.
     CPC ............... *C02F 1/16* (2013.01); *F01K 17/04* (2013.01); *C02F 2103/08* (2013.01); *C02F 2303/10* (2013.01); *Y02A 20/128* (2018.01); *Y02W 10/30* (2015.05)

(56) References Cited

FOREIGN PATENT DOCUMENTS

KR     10-2014-0060669 A     5/2014
KR     10-2014-0082426 A     7/2014

OTHER PUBLICATIONS

International Preliminary Report on Patentability and Written Opinion dated Jul. 6, 2017 in connection with PCT/KR2014/012950.

\* cited by examiner

[Fig. 1]
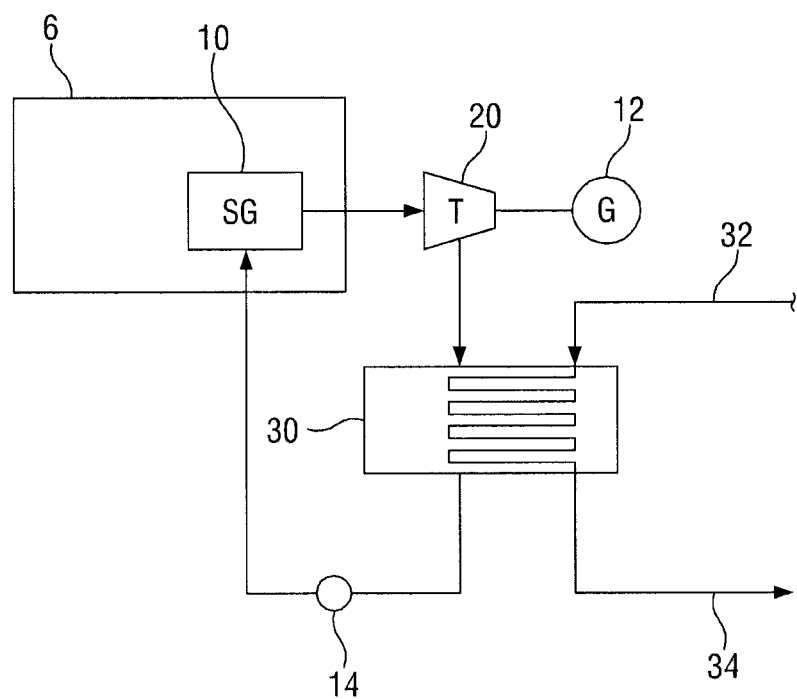

[Fig. 2]
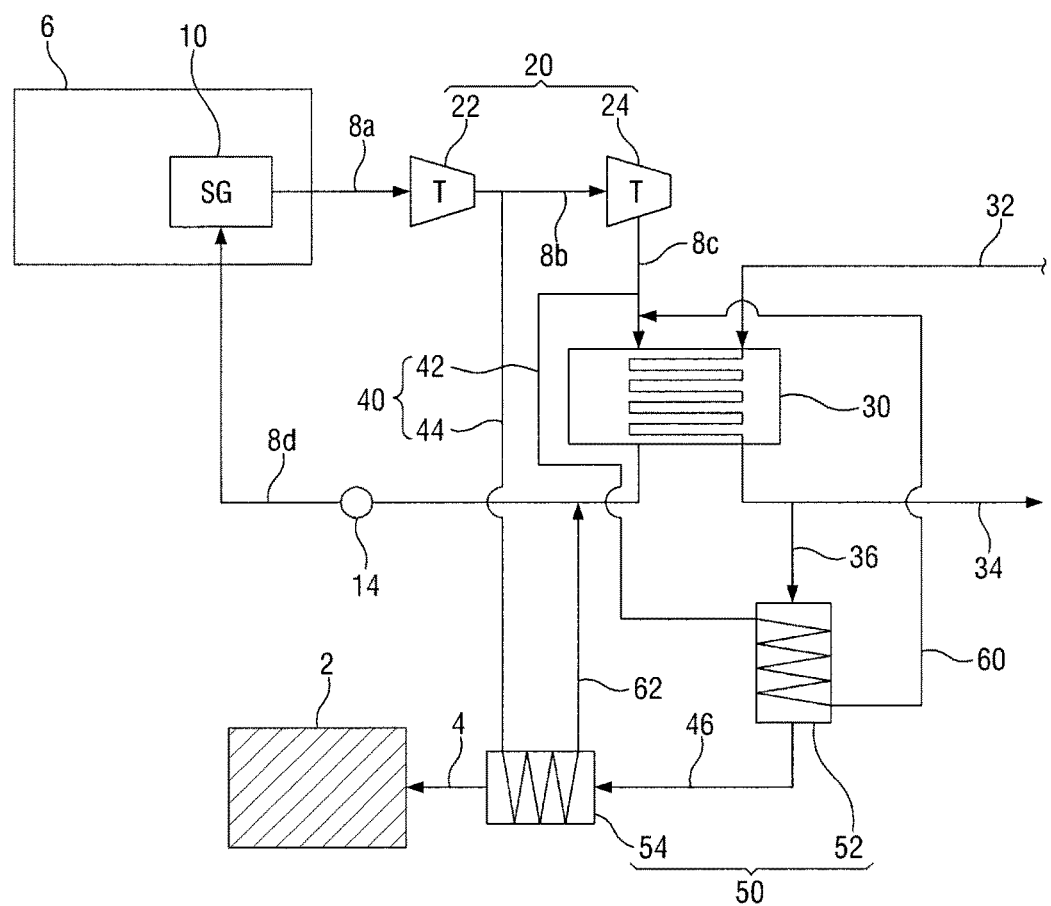

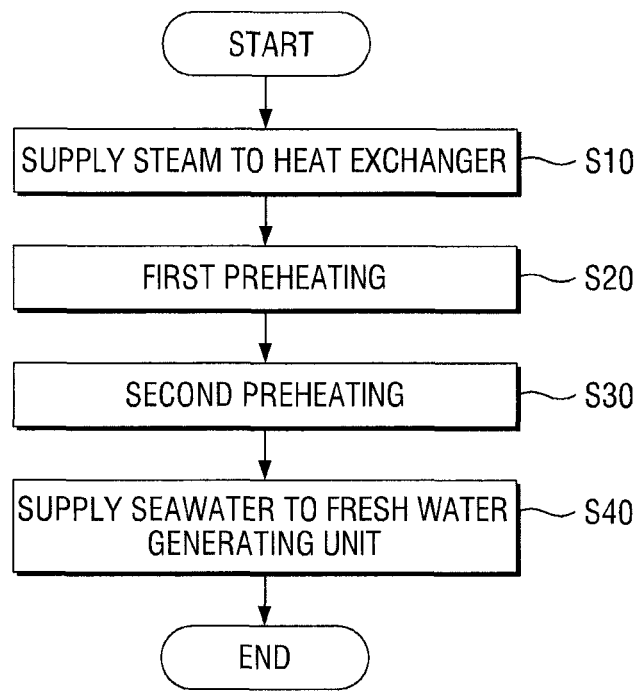
[Fig. 3]

ENERGY-SAVING SEAWATER DESALINATION SYSTEM USING STEAM GENERATED IN NUCLEAR REACTOR, AND METHOD FOR DESALINATING SEAWATER

This application is a national phase of PCT/KR2014/012950, filed Dec. 29, 2014, and claims priority to KR 10-2014-0188305, filed Dec. 24, 2014, the entire contents of both of which are hereby incorporated by reference.

TECHNICAL FIELD

The present disclosure relates to a seawater desalination system using steam generated in a nuclear reactor, and more particularly, to a seawater desalination system which improves energy efficiency by applying heated cooling water discharged from a nuclear power plant and high-temperature steam generated in a nuclear reactor to seawater desalination.

BACKGROUND ART

Nuclear power generation refers to an apparatus using nuclear fission occurring in a nuclear reactor. That is, the nuclear power generation refers to an apparatus wherein nuclear fission takes place by causing neutrons to collide with uranium nuclei, and converts heat resulting from nuclear fission into electric power.

The nuclear power plant requires a large amount of initial construction costs in comparison with other power generation methods, but has advantages in that power generation cost is low in view of cheap fuel cost. Furthermore, it is environmentally friendly because the nuclear power plant emits an extremely small amount of greenhouse gases. However, there are drawbacks in that radiation generated during a power generation process is detrimental to the environment or human bodies, and there still remain social issues and problems related to the storage and/or final disposal of high-level radioactive waste, and there are concerns about nuclear power plant accidents.

FIG. 1 schematically illustrates a nuclear power generation process in the related art. Referring to the related art, a nuclear power generation system includes a nuclear reactor 6, a steam generator 10, a turbine 20, a condenser 30, and the like.

Heat generated by nuclear fission in the reactor 6 is transferred to the steam generator 10 that produces high-temperature and high-pressure steam by using the transferred heat. The steam produced at the steam generator 10 is supplied into the turbine 20, and an electric generator 12 connected to the turbine 20 produces electricity.

Meanwhile, the steam used to produce electricity in the turbine 20 is supplied to the condenser 30. An inlet pipe 32 is installed to the condenser 30 such that seawater is introduced into the condenser 30, and a discharge pipe 34 is installed to the condenser 30 such that the introduced seawater is discharged back to the outside.

The condenser 30 produces condensate water by liquefying the steam discharged from the turbine 20. The seawater, which is introduced into the inlet pipe 32, may be used to liquefy the steam because the seawater is cold. The temperature of the seawater used to liquefy the steam is high, and the seawater is discharged to the discharge pipe 34.

In general, the temperature of the seawater used to liquefy the steam is increased by about 9 to 10° C. For example, in a case in which the seawater at temperature of 25° C. is introduced into the inlet pipe 32, the seawater, which has been used for the liquefaction process, is discharged to the discharge pipe 34 at higher temperature of about 35° C.

The condensate water produced in the condenser 30 is supplied back to the steam generator 10 by a circulation pump 14, and the steam generator 10 produces steam by using heat generated by nuclear fission.

Above, high-temperature seawater is discharged in the related art. The high-temperature seawater may adversely affect an environment and an ecosystem, and thus may be restricted by environmental regulations.

Therefore, in some instances, the discharged high-temperature seawater is mixed with cold seawater supplied from the deep sea, and then the seawater is discharged. However, this solution is not preferred because there are problems of complicated process and increased cost to be incurred.

In the Middle East, the seawater temperature is relatively high by and large, such that the amount of introduced seawater is 1.5 times larger than that in Korea. In particular, this problem is more serious in the west coast of the Persian Gulf, where the depth of the sea is very shallow and accordingly water temperature draws keen attention.

Meanwhile, in the related art, the high-temperature seawater discharged from the nuclear power plant is used in a desalination factory. The seawater needs to be heated to a temperature of 100° C. or higher in the desalination factory, and in a case in which the high-temperature seawater discharged from the nuclear power plant is used, energy required to heat the seawater may be saved as much as the amount of increased high-temperature seawater.

However, because the temperature of the seawater from the nuclear power plant is about 35° C., it is necessary to additionally heat the seawater even in the related art.

Therefore, there is a need for the development of a seawater desalination system capable of more efficiently using high-temperature seawater discharged from nuclear power plant.

DISCLOSURE

Technical Problem

The present disclosure has been made in an effort to solve the aforementioned problems in the related art, and an object of the present disclosure is to provide a user with a seawater desalination system capable of improving energy efficiency by applying heated seawater discharged from a nuclear power plant and high-temperature steam generated in a nuclear reactor to seawater desalination.

The present disclosure has also been made in an effort to provide a user with a seawater desalination system which is configured such that high-temperature seawater, which is discharged when steam is condensed in nuclear power plant, is supplied to a fresh water-generating unit, such that it is possible to save a considerable amount of energy to be used to produce fresh water, and to mitigate the ecological burden due to the emission of high-temperature seawater.

The present disclosure has also been made in an effort to provide users with a seawater desalination system in which a part of steam discharged from turbine is used for heat exchange with seawater, and the heat exchange is performed by two steps, such that it is possible to produce high-temperature seawater sufficient to produce fresh water without additional energy consumption.

The present disclosure has also been made in an effort to provide a user with a seawater desalination system capable of improving thermal efficiency by supplying steam used for heat exchange with seawater back to the circulation cycle of nuclear power plant.

Technical problems to be solved by the present disclosure are not limited to the aforementioned technical problem, and other technical problems, which are not mentioned above, may be clearly understood from the following descriptions by those skilled in the art to which the present disclosure pertains.

Technical Solution

To achieve the aforementioned objects, a seawater desalination system related to an example of the present disclosure uses a nuclear power generation facility including: steam generator 10 which generates steam; turbine 20 which is supplied with the steam in order to produce electricity; condenser 30 which is supplied with seawater from an inlet pipe 32, and liquefies the steam discharged from the turbine 20 by using the supplied seawater; and discharge pipe 34 which is connected to the condenser 30, and discharges the seawater, which is used to liquefy the steam, to the outside, and the seawater desalination system includes: steam supply pipe 40 which supplies heat exchange steam that is a part of the steam discharged from the turbine 20; seawater supply pipe 36 which diverges from the discharge pipe 34; heat exchanger 50 which is connected to the steam supply pipe 40 so as to be supplied with the heat exchange steam, and connected to the seawater supply pipe 36 so as to be supplied with first seawater that is a part of the seawater discharged from the condenser 30; and connection pipe 4 which connects the heat exchanger 50 and fresh water-generating unit 2, in which the heat exchanger 50 increases the water temperature of the first seawater by using heat included in the heat exchange steam, and the first seawater with the increased water temperature is supplied to the fresh water-generating unit 2 through the connection pipe 4, such that desalination of the first seawater may be performed.

In addition, the turbine 20 may further include: high-pressure turbine 22 which is connected to the steam generator 10 and supplied with the steam generated by the steam generator 10; and low-pressure turbine 24 which is connected to the high-pressure turbine 22 and supplied with the steam discharged from the high-pressure turbine 22.

In addition, the steam supply pipe 40 may further include: first steam supply pipe 42 which supplies first steam that is a part of the steam discharged from the low-pressure turbine 24; and second steam supply pipe 44 which supplies second steam that is a part of the steam discharged from the high-pressure turbine 22, and the heat exchange steam may include the first steam and the second steam.

In addition, the heat exchanger 50 may further include: first heat exchanger 52 which is connected to the first steam supply pipe 42 so as to be supplied with the first steam, and performs first preheating on the first seawater by using the supplied first steam; and second heat exchanger 54 which is connected to the second steam supply pipe 44 so as to be supplied with the second steam, and performs second preheating on the first seawater by using the supplied second steam.

In addition, the water temperature of the first seawater may be increased by the first preheating to first temperature range, and the water temperature of the first seawater may be increased by the second preheating to second temperature range higher than the first temperature range.

In addition, the steam may be circulated along a steam cycle configured by the steam generator 10, the high-pressure turbine 22, the low-pressure turbine 24, and the condenser 30.

In addition, the seawater desalination system may further include first return pipe 60 which is connected to the first heat exchanger 52 and supplies the steam cycle with the first steam on which the first preheating is performed.

In addition, the seawater desalination system may further include second return pipe 62 which is connected to the second heat exchanger 54 and supplies the steam cycle with the second steam on which the second preheating is performed.

To achieve the aforementioned objects, the method of desalinating seawater related to the present disclosure uses nuclear power generation facility including: steam generator 10 which generates steam; turbine 20 which is supplied with the steam in order to produce electricity; condenser 30 which is supplied with seawater from inlet pipe 32, and liquefies the steam discharged from the turbine 20 by using the supplied seawater; and discharge pipe 34 which is connected to the condenser 30, and discharges the seawater, which is used to liquefy the steam, to the outside, and the method includes: the first step of supplying heat exchange steam, which is a part of the steam discharged from the turbine 20, to heat exchanger 50; the second step of increasing, by the heat exchanger 50, the water temperature of first seawater by using heat included in the heat exchange steam; the third step of supplying the first seawater with the increased water temperature to a fresh water-generating unit 2; and the fourth step of desalinating, by the fresh water-generating unit 2, the first seawater, in which seawater supply pipe 36, which diverges from the discharge pipe 34, is connected to the heat exchanger 50, and supplies the first seawater, which is a part of the seawater discharged from the condenser 30, to the heat exchanger 50.

In addition, the turbine 20 may further include: a high-pressure turbine 22 which is connected to the steam generator 10 and supplied with the steam generated by the steam generator 10; and low-pressure turbine 24 which is connected to the high-pressure turbine 22 and supplied with the steam discharged from the high-pressure turbine 22, the heat exchanger 50 may further include: first heat exchanger 52 which is supplied with first steam that is a part of the steam discharged from the low-pressure turbine 24; and the second heat exchanger 54 which is supplied with second steam that is a part of the steam discharged from the high-pressure turbine 22, and the heat exchange steam may include the first steam and the second steam.

In addition, the second step may further include: first preheating step of performing, by the first heat exchanger 52, first preheating on the first seawater by using the first steam; and second preheating step of performing, by the second heat exchanger 54, second preheating on the first seawater by using the second steam.

Advantageous Effects

The present disclosure may provide users with the seawater desalination system capable of improving energy efficiency by applying heated seawater discharged from nuclear power plant and high-temperature steam generated in nuclear reactor to seawater desalination.

Specifically, the present disclosure may provide users with the seawater desalination system which is configured such that high-temperature seawater, which is discharged when steam is condensed in nuclear power plant, is supplied to the fresh water-generating unit, such that it is possible to save a considerable amount of energy to be used to produce fresh water, and to mitigate the ecological burden due to the emission of high-temperature seawater.

In addition, the present disclosure may provide users with the seawater desalination system in which a part of steam discharged from the turbine is used for heat exchange with seawater, and the heat exchange is performed by two steps, such that it is possible to produce high-temperature seawater sufficient to produce fresh water without additional energy consumption.

In addition, the present disclosure may provide users with the seawater desalination system capable of improving thermal efficiency by supplying steam used for heat exchange with seawater back to a circulation cycle of nuclear power generation.

Meanwhile, the effects obtained by the present disclosure are not limited to the aforementioned effects, and other effects, which are not mentioned above, will be clearly understood by those skilled in the art from the following description.

DESCRIPTION OF DRAWINGS

The following drawings attached to the present specification illustrate exemplary embodiments of the present disclosure and serve to further understand the technical spirit of the present disclosure together with the detailed description of the present disclosure, and the present disclosure should not be interpreted as being limited to the items illustrated in the drawings.

FIG. 1 is a view schematically illustrating a nuclear power generation process in the related art.

FIG. 2 is a view illustrating an example of a seawater desalination system capable of being applied to the present disclosure.

FIG. 3 is a flowchart related to an example of a seawater desalination method capable of being applied to the present disclosure.

DESCRIPTION OF MAIN REFERENCE NUMERALS OF DRAWINGS

2: Fresh water-generating unit
4: Connection pipe
6: Nuclear reactor
10: Steam generator
12: Electric generator
14: Circulation pump
20: Turbine
22: High-pressure turbine
24: Low-pressure turbine
30: Condenser
32: Inlet pipe
34: Discharge pipe
36: Seawater supply pipe
40: Steam supply pipe
42: First steam supply pipe
44: Second steam supply pipe
50: Heat exchanger
52: First heat exchanger
54: Second heat exchanger
60: First return pipe
62: Second return pipe
100: Seawater desalination system.

[Best Mode]

A seawater desalination system related to an example of the present disclosure uses nuclear power generation facility including: steam generator 10 which generates steam; turbine 20 which is supplied with the steam in order to produce electricity; condenser 30 which is supplied with seawater from inlet pipe 32, and liquefies the steam discharged from the turbine 20 by using the supplied seawater; and a discharge pipe 34 which is connected to the condenser 30, and discharges the seawater, which is used to liquefy the steam, to the outside, and the seawater desalination system includes: a steam supply pipe 40 which supplies heat exchange steam that is a part of the steam discharged from the turbine 20; a seawater supply pipe 36 which diverges from the discharge pipe 34; a heat exchanger 50 which is connected to the steam supply pipe 40 so as to be supplied with the heat exchange steam, and connected to the seawater supply pipe 36 so as to be supplied with first seawater that is a part of the seawater discharged from the condenser 30; and a connection pipe 4 which connects the heat exchanger 50 and a fresh water-generating unit 2, in which the heat exchanger 50 increases a water temperature of the first seawater by using heat included in the heat exchange steam, and the first seawater with the increased water temperature is supplied to the fresh water-generating unit 2 through the connection pipe 4, such that desalination of the first seawater may be performed.

Hereinafter, an exemplary embodiment of the present disclosure will be described with reference to the drawings. In addition, the exemplary embodiment described below does not unfairly limit the contents of the present disclosure disclosed in the claims, and all of the constituent elements described in the exemplary embodiment are not essential as technical solutions of the present disclosure.

<Seawater Desalination System>

Hereinafter, the seawater desalination system of the present disclosure will be specifically described with reference to the drawings.

FIG. 2 is a view illustrating an example of a seawater desalination system capable of being applied to the present disclosure.

Referring to FIG. 2, a seawater desalination system 100 of the present disclosure uses the nuclear reactor 6, the steam generator 10, the turbine 20, the condenser 30, and the like, which are used in the related art, and the seawater desalination system 100 further includes the heat exchanger 50 which includes a first heat exchanger 52 and a second heat exchanger 54, and pipes which connect the first heat exchanger 52 and the second heat exchanger 54.

The constituent elements illustrated in FIG. 2 are not essential constituent elements, and the seawater desalination system 100 may be implemented to have more or less constituent elements.

The nuclear reactor 6 includes a reactor core, a moderator, a control rod, a coolant, and the like. A nuclear fission chain reaction, which occurs at the reactor core, generates a large amount of heat, and a speed of neutrons emitted from the nuclear fission is controlled by the moderator. The control rod adjusts a rate of the nuclear fission chain reaction occurring at the reactor core, and the coolant prevents the reactor core from overheating.

The steam generator 10 is supplied with heat generated by the nuclear fission, and generates high-temperature and high-pressure steam.

The turbine 20 is supplied with the steam generated by the steam generator 10, and the turbine 20 is connected to an electric generator 14, and may produce electricity by using the steam. The turbine 20 includes a high-pressure turbine 22 and a low-pressure turbine 24.

Corresponding to the turbine 20, the heat exchanger 50 has two stages, and includes the first heat exchanger 52 and the second heat exchanger 54. The first heat exchanger 52 and the second heat exchanger 54 are connected to each other through a pipe 46.

The high-pressure turbine 22 is connected to the steam generator 10 through a first pipeline 8a, and supplied with the steam generated by the steam generator 10. The low-pressure turbine 24 is connected to the high-pressure turbine 22 through a second pipeline 8b, and supplied with the steam discharged from the high-pressure turbine 22.

A second steam supply pipe 44 diverges from the second pipeline 8b. Second steam, which is a part of the steam discharged from the high-pressure turbine 22, is supplied to the second heat exchanger 54 through the second steam supply pipe 44.

A second return pipe 62 is connected to the second heat exchanger 54. The second steam, which is used for heat exchange in the second heat exchanger 54, is supplied to a fourth pipe 8d through the second return pipe 62. However, the present disclosure is not limited to the configuration in which the second return pipe 62 is connected to the fourth pipe 8d as illustrated in FIG. 2, and it is acceptable as long as there is a configuration for supplying the second steam to a steam cycle.

In addition, a first steam supply pipe 42 diverges from a third pipeline 8c. First steam, which is a part of the steam discharged from the low-pressure turbine 24, is supplied to the first heat exchanger 52 through the first steam supply pipe 42.

A first return pipe 60 is connected to the first heat exchanger 52. The first steam, which is used for heat exchange in the first heat exchanger 52, is supplied to a third pipe 8c through the first return pipe 60. However, the present disclosure is not limited to the configuration in which the first return pipe 60 is connected to the third pipe 8c as illustrated in FIG. 2, and it is acceptable as long as there is a configuration for supplying the first steam to the steam cycle.

Meanwhile, the condenser 30 and the low-pressure turbine 24 are connected to each other through the third pipeline 8c, and the condenser is supplied with the steam discharged from the low-pressure turbine 24 through the third pipeline 8c.

The inlet pipe 32 and the discharge pipe 34, which are connected to the outside, are formed on the condenser 30. The inlet pipe 32 is a passageway through which outside seawater is introduced, and the discharge pipe 34 is a passageway through which the seawater used in the condenser 34 is discharged.

The condenser 30 and the steam generator 10 are connected to each other through a fourth pipeline 8d. The condensate water produced in the condenser 30 returns back to the steam generator 10 through the fourth pipeline 8d.

The seawater supply pipe 36 diverges from the discharge pipe 34. The seawater supply pipe 36 supplies the first seawater, which is a part of the seawater discharged from the condenser 30, to the first heat exchanger 52.

A water temperature of the first seawater is increased as the first seawater passes through the first heat exchanger 52 and the second heat exchanger 54. The first seawater is supplied to the fresh water-generating unit 2 through the connection pipe 4, and desalination of the first seawater is performed in the fresh water-generating unit 2.

<Seawater Desalination Method>

Hereinafter, the seawater desalination method of the present disclosure will be specifically described with reference to the drawings.

FIG. 3 is a flowchart related to an example of the seawater desalination method capable of being applied to the present disclosure.

Referring to FIG. 3, the heat exchange steam, which is a part of the steam discharged from the turbine 20, is supplied to the heat exchanger 50 (S10).

As described above, the turbine 20 has the two stages, that is, the high-pressure turbine 22 and the low-pressure turbine 24.

The high-pressure turbine 22 is supplied with the steam generated by the steam generator 10 through the first pipeline 8a, and produces electricity by using the steam. The steam passing through the high-pressure turbine 22 is converted into high-temperature saturated steam as pressure of the steam is decreased. By a heater (not illustrated) installed in the second pipeline 8b, moisture may be removed from the high-temperature saturated steam, and the high-temperature saturated steam may be heated again.

The second steam, which is a part of the steam discharged from the high-pressure turbine 22, is supplied to the second heat exchanger 54 through the second steam supply pipe 44 that diverges from the second pipeline 8b. In particular, 10% to 40% of the steam discharged from the high-pressure turbine 22 is supplied to the second heat exchanger 54.

Meanwhile, the low-pressure turbine 24 is supplied with the steam from the high-pressure turbine 22 through the second pipeline 8b, and produces electricity by using the steam.

The first steam, which is a part of the steam discharged from the low-pressure turbine 24, is supplied to the first heat exchanger 52 through the first steam supply pipe 42 that diverges from the third pipeline 8c. In particular, 10% to 40% of the steam discharged from the low-pressure turbine 24 is supplied to the first heat exchanger 52.

As described above, the first steam and the second steam, which are a part of the steam discharged from the turbine 20, are supplied to the first heat exchanger 52 and the second heat exchanger 54 through the first steam supply pipe 42 and the second steam supply pipe 44, respectively.

Subsequently, first preheating is performed on the first seawater in the first heat exchanger 52 by using heat included in the first steam (S20). A water temperature of the first seawater is increased to a first temperature range by the first preheating. For example, the first seawater, which flows along the seawater supply pipe 36, has a temperature of about 35° C., and a water temperature of the first seawater on which the first preheating is performed is increased to about 60° C., and has a temperature range from 50° C. to 70° C.

Meanwhile, the first steam on which the first preheating is performed in the first heat exchanger 52 returns back to the steam cycle through the first return pipe 60.

Subsequently, second preheating is performed on the first seawater in the second heat exchanger 54 by using heat included in the second steam (S30). A water temperature of the first seawater is increased by the second preheating to a second temperature range higher than the first temperature range. For example, a water temperature of the first seawater on which the second preheating is performed is increased to about 100° C., and has a temperature range from 90° C. to 110° C.

Meanwhile, the second steam on which the second preheating is performed in the second heat exchanger 54 returns back to the steam cycle through the second return pipe 62.

Subsequently, the first seawater with the increased water temperature is supplied to the fresh water-generating unit 2, and the desalination of the first seawater is performed in the fresh water-generating unit 2 (S40).

According to the seawater desalination system and the seawater desalination method of the present disclosure, which have been described above, it is possible to heat the seawater to a desired numerical value without incurring additional costs, and as a result, it is possible to minimize costs required to desalinate the seawater, utilize the steam generated by the nuclear power generation for the multiple purposes, and efficiently use thermal energy. In addition, according to the present disclosure, the amount of energy for heating the seawater is reduced by using the waste cooling water from the nuclear power plant, and the seawater is desalinated by using the steam discharged from the nuclear power plant turbine, and as a result, it is possible to provide the seawater desalination system and the electric power generation system capable of supplying both of economic electric power and water to a user.

Meanwhile, the present disclosure may also be implemented as computer-readable codes written on a computer-readable recording medium. The computer-readable recording medium includes all types of recording devices on which data can be recorded in a computer-readable manner. For example, the computer-readable recording medium includes a ROM, a RAM, a CD-ROM, a magnetic tape, a floppy disk, an optical data storage device, and a carrier wave (e.g., transmission via the Internet). In addition, the computer-readable recording medium may be distributed over computer systems connected to one another by a network, such that computer-readable codes may be stored and executed in the computer-readable recording medium in a decentralized manner. In addition, functional programs, codes, and code segments for implementing the present disclosure may be easily inferred by programmers in the art to which the present disclosure pertains.

In addition, the system and the method, which have been described above, are not limited by the configurations and methods of the exemplary embodiments as described above, but the exemplary embodiments may also be configured by selectively combining a whole or part of the exemplary embodiments, such that various modifications can be made.

The invention claimed is:

1. A seawater desalination system which uses a nuclear power generation facility which includes:
   a steam generator which generates steam by heat generated by nuclear fission at a reactor core of the nuclear power generation facility;
   a turbine which is supplied with the steam in order to produce electricity;
   a condenser which is supplied with seawater from an inlet pipe, and liquefies the steam discharged from the turbine by using the supplied seawater; and
   a discharge pipe which is connected to the condenser, and discharges the seawater, which is used to liquefy the steam, to the outside, the seawater desalination system comprising:
   a steam supply pipe which supplies heat exchange steam that is a part of the steam discharged from the turbine;
   a seawater supply pipe which diverges from the discharge pipe;
   a heat exchanger which is connected to the steam supply pipe so as to be supplied with the heat exchange steam, and connected to the seawater supply pipe so as to be supplied with first seawater that is a part of the seawater discharged from the condenser; and
   a connection pipe which connects the heat exchanger and a fresh water-generating unit,
   wherein the heat exchanger increases a water temperature of the first seawater by using heat included in the heat exchange steam, and the first seawater with the increased water temperature is supplied to the fresh water-generating unit through the connection pipe, such that desalination of the first seawater is performed,
   wherein the turbine includes a high-pressure turbine which is connected to the steam generator and supplied with the steam generated by the steam generator, and a low-pressure turbine which is connected to the high-pressure turbine and supplied with the steam discharged from the high-pressure turbine,
   wherein the steam supply pipe includes a first steam supply pipe which supplies first steam that is a part of the steam discharged from the low-pressure turbine and a second steam supply pipe which supplies second steam that is a part of the steam discharged from the high-pressure turbine, and
   the heat exchange steam includes the first steam and the second steam,
   wherein the heat exchanger includes a first heat exchanger which is connected to the first steam supply pipe so as to be supplied with the first steam, and performs first preheating on the first seawater by using the supplied first steam, and a second heat exchanger which is connected to the second steam supply pipe so as to be supplied with the second steam, and performs second preheating on the first seawater by using the supplied second steam,
   wherein a first return pipe which is connected to the first heat exchanger and supplies the steam cycle with the first steam on which the first preheating is performed, and a second return pipe which is connected to the second heat exchanger and supplies the steam cycle with the second steam on which the second preheating is performed.

2. The seawater desalination system of claim 1, wherein a water temperature of the first seawater is increased by the first preheating to a first temperature range, and a water temperature of the first seawater is increased by the second preheating to a second temperature range higher than the first temperature range.

3. The seawater desalination system of claim 1, wherein the steam is circulated along a steam cycle configured by the steam generator, the high-pressure turbine, the low-pressure turbine, and the condenser.

4. A method of desalinating seawater, which uses a nuclear power generation facility which includes:
   a steam generator which generates steam by heat generated by nuclear fission at a reactor core of the nuclear power generation facility;
   a turbine which is supplied with the steam in order to produce electricity;
   a condenser which is supplied with seawater from an inlet pipe, and liquefies the steam discharged from the turbine by using the supplied seawater; and
   a discharge pipe which is connected to the condenser, and discharges the seawater, which is used to liquefy the steam, to the outside, the method comprising:
   a first step of supplying heat exchange steam, which is a part of the steam discharged from the turbine, to a heat exchanger;

a second step of increasing, by the heat exchanger, a water temperature of first seawater by using heat included in the heat exchange steam;

a third step of supplying the first seawater with the increased water temperature to a fresh water-generating unit; and a fourth step of desalinating, by the fresh water-generating unit, the first seawater, wherein a seawater supply pipe, which diverges from the discharge pipe, is connected to the heat exchanger, and supplies the first seawater, which is a part of the seawater discharged from the condenser, to the heat exchanger, wherein the turbine includes a high-pressure turbine which is connected to the steam generator and supplied with the steam generated by the steam generator, and a low-pressure turbine which is connected to the high-pressure turbine and supplied with the steam discharged from the high-pressure turbine; and the heat exchanger includes a first heat exchanger which is supplied with first steam that is a part of the steam discharged from the low-pressure turbine; and a second heat exchanger which is supplied with second steam that is a part of the steam discharged from the high-pressure turbine, and the heat exchange steam includes the first steam and the second steam, wherein the second step includes a first preheating step of performing, by the first heat exchanger, first preheating on the first seawater by using the first steam; and a second preheating step of performing, by the second heat exchanger, second preheating on the first seawater by using the second steam.

* * * * *